US007146406B2

(12) United States Patent
Ozawa

(10) Patent No.: US 7,146,406 B2
(45) Date of Patent: Dec. 5, 2006

(54) SERVER APPARATUS AND METHOD TO DISTRIBUTE MEDIA DATA

(75) Inventor: Masatoshi Ozawa, Zama (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 699 days.

(21) Appl. No.: 09/892,847

(22) Filed: Jun. 28, 2001

(65) Prior Publication Data

US 2002/0002620 A1 Jan. 3, 2002

(30) Foreign Application Priority Data

Jun. 29, 2000 (JP) ............................. 2000-197097

(51) Int. Cl.
G06F 15/16 (2006.01)
(52) U.S. Cl. ...................... 709/217; 709/202; 709/237
(58) Field of Classification Search ................ 709/217, 709/218, 219, 223, 224, 225, 231, 232, 201–203, 709/236, 237
See application file for complete search history.

(56) References Cited

U.S. PATENT DOCUMENTS

| | | | | |
|---|---|---|---|---|
| 5,619,425 | A * | 4/1997 | Funahashi et al. .......... | 709/219 |
| 6,161,143 | A * | 12/2000 | Tayama et al. ............. | 709/238 |
| 6,199,077 | B1 * | 3/2001 | Inala et al. ............... | 715/501.1 |
| 6,282,564 | B1 * | 8/2001 | Smith et al. ................ | 709/206 |
| 6,321,142 | B1 * | 11/2001 | Shutty ............................ | 701/1 |
| 6,401,113 | B1 * | 6/2002 | Lazaridis et al. ........... | 709/207 |
| 6,460,076 | B1 * | 10/2002 | Srinivasan ................... | 709/219 |
| 6,496,481 | B1 * | 12/2002 | Wu et al. .................... | 370/242 |
| 6,545,988 | B1 * | 4/2003 | Skog ........................... | 370/329 |
| 6,587,877 | B1 * | 7/2003 | Douglis et al. ............. | 709/224 |
| 6,658,247 | B1 * | 12/2003 | Saito .......................... | 340/7.2 |
| 6,691,165 | B1 * | 2/2004 | Bruck et al. ................ | 709/227 |
| 6,748,278 | B1 * | 6/2004 | Maymudes ................... | 700/17 |
| 6,763,377 | B1 * | 7/2004 | Belknap et al. ............. | 709/223 |
| 2001/0039560 | A1 * | 11/2001 | Uchida et al. .............. | 709/200 |

FOREIGN PATENT DOCUMENTS

| | | | |
|---|---|---|---|
| JP | 7-114504 | * | 5/1995 |
| JP | 10-150505 | * | 6/1998 |

(Continued)

OTHER PUBLICATIONS

English abstract and translation of relevant portion of JP 11-289528.*

(Continued)

*Primary Examiner*—Bunjob Jaroenchonwanit
*Assistant Examiner*—Victor Lesniewski
(74) *Attorney, Agent, or Firm*—Greenblum & Bernstein, P.L.C.

(57) ABSTRACT

A server apparatus to transmit music data is provided with a distribution request process section that receives music number, a reading section that reads out the music data from a contents server, and a notification process section that notifies the terminal of the music number, the size of the music data and the starting block number of the music data. The music data is divided into a plurality of block units. The server further includes a reception process section that receives a response from the terminal confirming the music number, the size of the music data and the starting block number of the music data, a communication section that transmits each block of the music data to the terminal, a block confirmation reception section that receives a confirmation notification from the terminal when the terminal normally receives each block of the music data. A control section, when the confirmation notification is received, transmits the next block of the music data, and, when the confirmation notification is not received within a predetermined period, executes an error process.

17 Claims, 9 Drawing Sheets

FOREIGN PATENT DOCUMENTS

| | | | |
|---|---|---|---|
| JP | 10-198610 | | 7/1998 |
| JP | 11-136365 | * | 5/1999 |
| JP | 11-187126 | | 7/1999 |
| JP | 11-234436 | * | 8/1999 |
| JP | 02-260055 | * | 10/1999 |
| JP | 11-289528 | * | 10/1999 |
| JP | 11-313366 | | 11/1999 |
| JP | 11-341044 | * | 12/1999 |
| JP | 11355346 | | 12/1999 |
| JP | 2000-032429 | * | 1/2000 |
| JP | 2000-076158 | | 3/2000 |
| JP | 2000-134332 | | 5/2000 |
| JP | 2000-134406 | | 5/2000 |
| JP | 2001-244874 | | 9/2000 |
| JP | 2001-258067 | | 9/2001 |
| JP | 2002-006857 | | 1/2002 |
| JP | 2002-014919 | | 1/2002 |

OTHER PUBLICATIONS

English abstract and translation of relevant portion of JP 11-136365.*

English abstract of JP 2-260055.*

English abstract of JP 2000-032429.*

English abstract and translation of a relevant portion of JP 11-341044.*

English abstract and translation of relevant portion of JP 10-150505.*

English abstract of JP 7-114504.*

English abstract of JP 11-234436.*

English Language Abstract of JP 2002-014919.

English Language Abstract of JP 2002-006857.

English Language Abstract of JP 2000-134332.

English Language Abstract of JP 2000-134406.

English Language Abstract of JP 2000-076158.

English Language Abstract of JP 2001-244874.

English Language Abstract of JP 2001-258067.

English Language Abstract of JP 11-187126.

English Language Abstract JP 11-313366.

English Language Abstract of JP 10-198610.

* cited by examiner

61 : Internet
63 : ISDN telephone network
67 : Voice distribution system back bone

SERVER APPARATUS AND METHOD TO DISTRIBUTE MEDIA DATA

BACKGROUND OF THE INVENTION

1. Field of the Invention

The present invention relates to a server apparatus that transmits and distributes music data to a reception terminal.

2. Description of the Related Art

In a music distribution system disclosed in Japanese Laid-Open Patent Publication HEI11-355346, a terminal apparatus transmits requested music (a piece of music) and distribution request time information to a distribution server, while the distribution server that receives the request distributes the requested music to the terminal apparatus at the distribution time.

The terminal apparatus transmits a request for music data to a distribution server through a communication channel, while transmitting the time at which the requested music data is to be distributed. The distribution server determines distribution schedule time based on the distribution request time from the terminal corresponding to the past distribution result and transmission path condition, and transmits the information requested from the terminal at the distribution schedule time. The terminal apparatus is placed in a standby condition by a timer until the distribution schedule time. At the distribution schedule time, the terminal is automatically started by the timer into a distribution waiting condition. Then, distribution server distributes the requested music data through a satellite. The distributed music data is received at terminal apparatus. When the reception is completed, the power of the terminal is turned off.

However, since the music information is generally composed of a large file, when a distribution error occurs due to, for example, protocol during the distribution according to the conventional method, it is necessary to redistribute the entire file, and therefore the method is poor in distribution efficiency.

SUMMARY OF THE INVENTION

It is an object of the present invention to provide an information distribution server apparatus and information receiving terminal apparatus capable of starting transmission from a middle portion of a data file, such as a music data file when the distribution processing causes an error at the middle portion of the data and the distribution reprocessed.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

Figure 1:
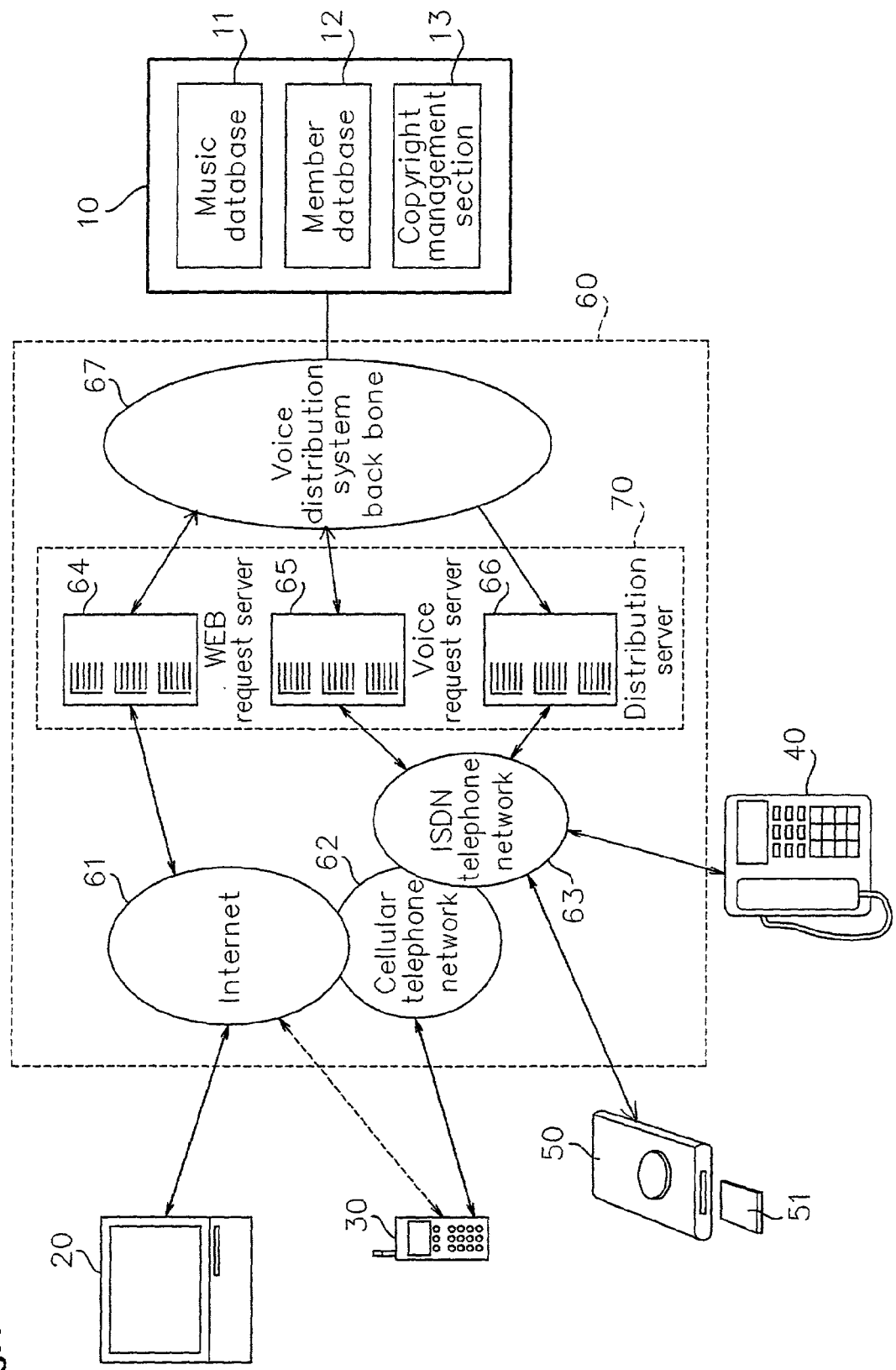
FIG. 1 illustrates a schematic diagram showing a network on which the information receiver of one embodiment of the present invention operates.

FIG. 1 is a schematic drawing of a network on which an information receiver of one embodiment of the present invention operates. In FIG. 1, the network comprises a music contents server 10 (hereafter referred to as "contents server"); a PC 20 installed at each user's home, a cellular telephone 30 that a user carries when going out, a telephone 40 installed at each user's home and an information receiver 50.

The contents server 10 comprises a music database (DB) 11 that stores various music information such as information of recent music and information about artists, and member DB 12 that stores information of entities (individuals or organizations) that are registered as members so as to be provided the music distribution service of the contents server 10. The contents server 10 further comprises a copyright management section 13 that provides for encryption on the music information in order to manage/protect the copyright of music information.

PC 20, possessing a browser capability as well as the ordinary functions of a PC, can access various home pages provided on Internet 61. The cellular telephone 30 is connected to an ISDN network/telephone service network 63 via a cellular telephone network 62 and can communicate with a desired party. The cellular telephone 30 has a browser capability, and can access the various home pages provided on Internet 61 via the cellular telephone network 62. The telephone 40 is always connected to ISDN network/telephone service network 63, and can communicate with a desired party.

The information receiver 50, like the telephone 40, is always connected to ISDN/telephone service network 63. Further a telephone number is assigned to it, which can be either the same as or different from the telephone number of the home where the information receiver 50 of the present invention is installed. The information receiver 50 can also write the information received via ISDN/telephone service network 63 to an installed memory card 51 as described in detail later.

By the use of PC 20, the cellular telephone 30, the telephone 40 and the information receiver 50, it is possible to receive the music distribution service provided by the contents server 10 via a communication network 60.

More specifically, by the use of browser capability of the PC 20 or the cellular telephone 30, it is possible to access the homepage provided by a WEB request server 64 via Internet 61. The user of PC 20 or the cellular telephone 30 can input a request to a request menu of the homepage.

On the other hand, by the use of communication capability of the telephone 40 or the cellular telephone 30, the telephone number of a voice request server 65 is called via ISDN/telephone service network 63. Thus a user of the telephone 40 or the cellular telephone 30 can input a request following the guidance provided by the voice request server 65.

The request inputted by following the guidance as mentioned above is transmitted to the contents server 10 via a music distribution system backbone 67. The contents server 10 transmits the music data corresponding to the request to a distribution server 66.

The distribution server 66 receives the music data transmitted by the contents server 10. The music data is distributed to the information receiver 50 based on the request input by the WEB request server 64 or the voice request server 65 via ISDN/telephone service network 63.

The information receiver 50 downloads the distributed music data and writes the downloaded music data to the installed memory card 51. The user can listen to the music distributed from the contents server 10 by playing back the music data recorded in the memory card 51 using an appropriate playback device. Thus as mentioned above it is possible to receive the music distribution service provided by the contents server 10.

The WEB request server 64, the voice request server 65 and the distribution server 66 are connected to the contents server 10 via the music distribution system backbone 67. In the present embodiment, the voice distribution system backbone 67 is a transmission path that provides high-speed communication of large volume data to provide the music distribution service.

In order to realize stable data communication, it is preferable for the WEB server 64, the voice request server 65 and the distribution server 66 to be connected via dedicated line. However the present invention is not limited to the use of dedicated line, but use of Internet, ISDN network, and a telephone service network are also possible.

It is also preferable that plural servers provided these functions of the WEB server 64, the voice request server 65, and the distribution server 66. In other words, it is preferable to provide the functions by plural servers when requests are made from many users, or when large volumes of data, such as music data, are sent to requested users. In order to provide these functions by plural servers, it is necessary to manage information, such as distribution time, as is described later, between servers via music distribution system backbone 67. It is possible to install an additional distribution management server on the music distribution system backbone 67.

However the present invention is not limited to this configuration. It is also possible to provide all of these functions by a single server. For the convenience of description, it is assumed that a single server provides these functions. Hereafter, a single server that provides the functions of the WEB server 64, the voice request server 65 and the distribution server 66 is referred to as server 70.

Thus, using a PC 20, either of a cellular telephone 30 or a telephone 40 instead of a PC 20, and by requesting a desired music data, the information receiver 50 can download the music data from the contents server 10. In this process, the music data provided by the contents server 10 is distributed to the information receiver 50 via ISDN network/telephone service network 63. A dedicated communication path is established between the server 70 and the information receiver 50 and music data is distributed via the communication path, which thus serves as a distribution path.

As the result, the time necessary for downloading music data can be shortened, in comparison with a situation in which the Internet 61 is used as a distribution path, like a conventional music distribution service. It is also possible to cut down telephone charges because the time for downloading music data is shortened. Further, it is possible to provide the music distribution service to wider range of consumers, such as users of cellular phones and ordinary telephones because it is possible to request music data not only from PC 20 but also from a cellular telephone 30 or a telephone 40.

Hereafter, the configurations of the information receiver 50 and the server 70, necessary for realizing above mentioned music distribution service, are described.

Figure 2:
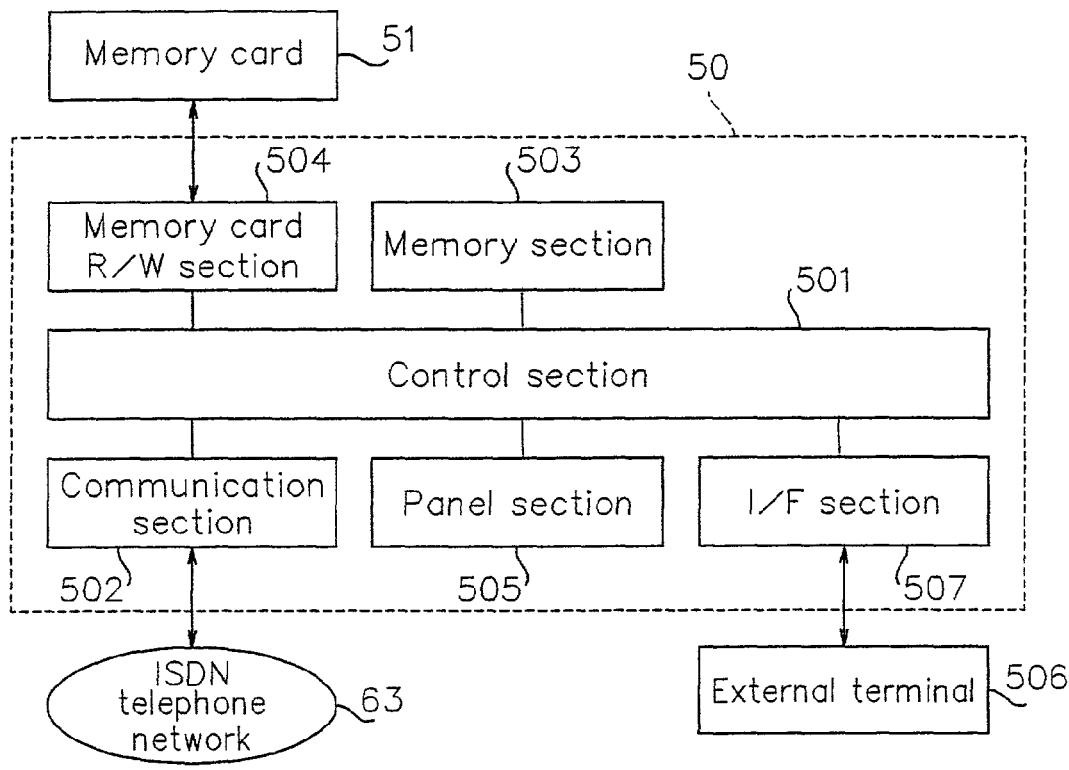
FIG. 2 illustrates a block diagram of the configuration of the information receiver of the embodiment of the present invention

FIG. 2 is a block diagram showing the configuration of the information receiver 50. As shown in FIG. 2, the information receiver 50 comprises a control section 501 that controls the whole device. For example, the control section 501 can be a CPU. The control section 501 performs the function of deciphering encrypted music information downloaded from the contents server 10, based on the program stored in a memory section, and the function of managing the copyright of the downloaded music. A communication section 502, a memory section 503, a memory card read/write section (hereafter referred to as a memory card R/W section) and a panel section 505 are connected to the control section 501.

The communication section 502 is connected to ISDN network/telephone service network 63, and exchanges data with ISDN/telephone service network 63. The communication section 502, for example, can be embodied as a DSU (Data service unit) and a modem. The communication section 502 also provides for execution of a reception process, receiving a call signal from a switching center.

The memory section 503, for example, can be embodied as a ROM and a RAM. The memory section 503 stores a program for the control section 501 to control the information receiver 50. The memory section 503 has an area for the control section 501 to use as work memory and an area used for temporally storing data such as music data received via the communication section 502.

Controlled by the control section 501, the memory card R/W section 504 writes the data such as music data stored in the memory section 503 into the memory card 51 installed at the information receiver 50. At the same time, it reads information, such as the available space of the memory card 51 and forwards the read information to the control section 501.

The panel section 505 displays information such as the available space of the memory card 51 that is read by the memory card R/W section 504 and the present status of the information receiver 50 (for example. communication status).

An I/F section 507 is connected to the control section 501 for connecting an external terminal 506 such as a PC to the receiver 50. The control section 501 executes data communication with the external terminal 506 via the I/F section 507. The I/F section is used when music data downloaded via ISDN/telephone service network 63 as mentioned above are stored in the external terminal 506. When music data are downloaded by PC via the Internet in a conventional way, the I/F section is also used for writing the music data to the memory card 51, though this is not an essential function of the information receiver 50. The I/F section 507 is also used for connecting the information receiver 50 to a network such as LAN.

The server 70 is structured in the same way as usual PC. The server 70 provides a homepage that displays request menu screen to a terminal such as a PC via Internet when it functions as the WEB request server 64. Also, the server 70 provides voice guidance via ISDN/telephone service network 63 (ISDN/telephone service network 63 and cellular telephone network 62 for the cellular telephone 30) when it functions as a voice request server 65. Further, the server 70 transmits music data transmitted from the contents server 10 to the information receiver 50 based on the requests from various terminals via ISDN/telephone service network 63 when it functions as a distribution server 66.

Figure 3:
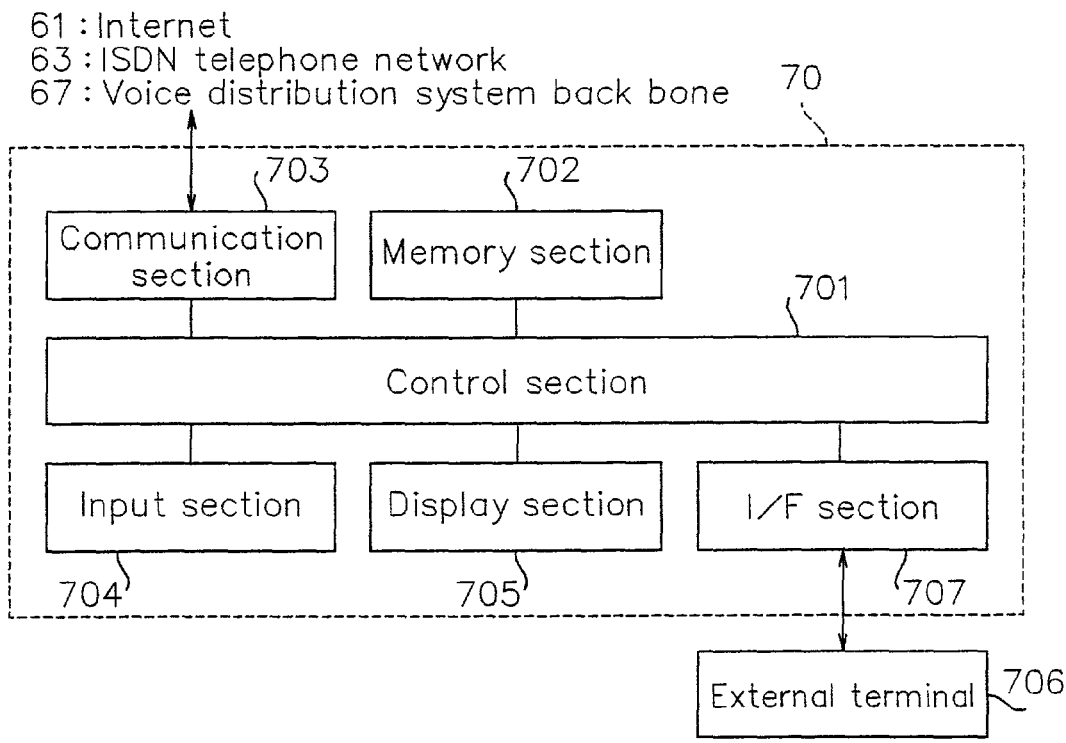
FIG. 3 illustrates a block diagram showing the configuration of the server of the embodiment.

FIG. 3 is a block diagram showing the configuration of the server 70. As shown in FIG. 3, the server 70 comprises a control section 701 that controls the entire server. The control section 701, for example, can be embodied as a CPU. A memory section 702, a communication section 703, an input section 704 and a display section 705 are connected to the control section 701.

The memory section 702, for example, can comprise of a ROM, a RAM and a Hard disk. The memory section 702 stores a program for the control section 701 to control the server 70. The memory section 702 has an area that the control section 701 uses as work memory and an area that is used for storing data such as music data received by the communication section 703, which is described later, via the music distribution backbone 67.

The communication section 703 is connected to Internet 61, ISDN/telephone service network 63 and the music distribution system backbone 67 and exchanges data with these networks. The communication section 703 can include a plurality of communication control boards such as LAN boards. More specifically, the communication section 703 uses the LAN board for communicating with Internet 61 and the music distribution system backbone when the server 70 serves as WEB request server 64. When the server 70 serves as the voice request server 65, an ISDN circuit control board and a voice control board are used for the communication with ISDN/telephone service network 63 and LAN board is used for the communication with the music distribution backbone 67. When the server 70 serves as the distribution server 66, an ISDN circuit control board and a data communication control board are used for communicating with ISDN/telephone service network 63 and a LAN board is used for communicating with the music distribution system backbone 67.

The server 70 (when the functions of the server 70 are performed by a plurality of servers, the server that functions as the voice request server) is connected to ISDN/telephone service network 63 all the time, and a telephone number is assigned to it. The communication section 703 serves to execute reception process upon receiving a call signal from a switching center.

The input section 704 is a section to which an operator of the server 70 inputs the necessary setup commands and operating instructions. The display section 705 displays the necessary setup commands and operating instructions input from the input section 704 and also the present status of the server 70 (for example, communication status of the server).

An I/F section for connecting with an external terminal 706 such as a printer is connected to the control section 701. The control section 701 communicates with the external terminal 706 via the I/F 707.

Figure 4:
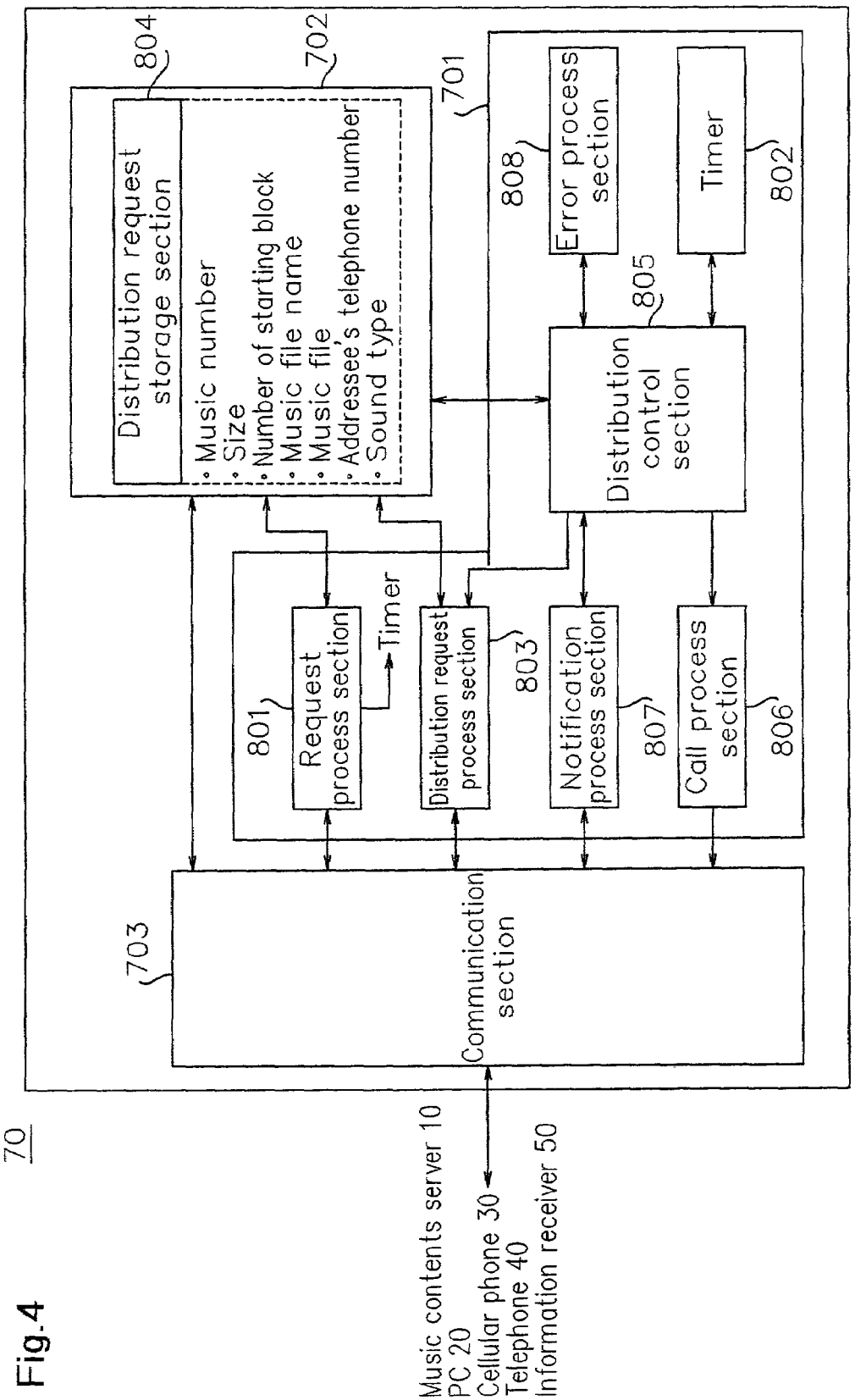
FIG. 4 illustrates a block diagram showing the configuration of a portion the server of the embodiment in greater detail.
Figure 5:
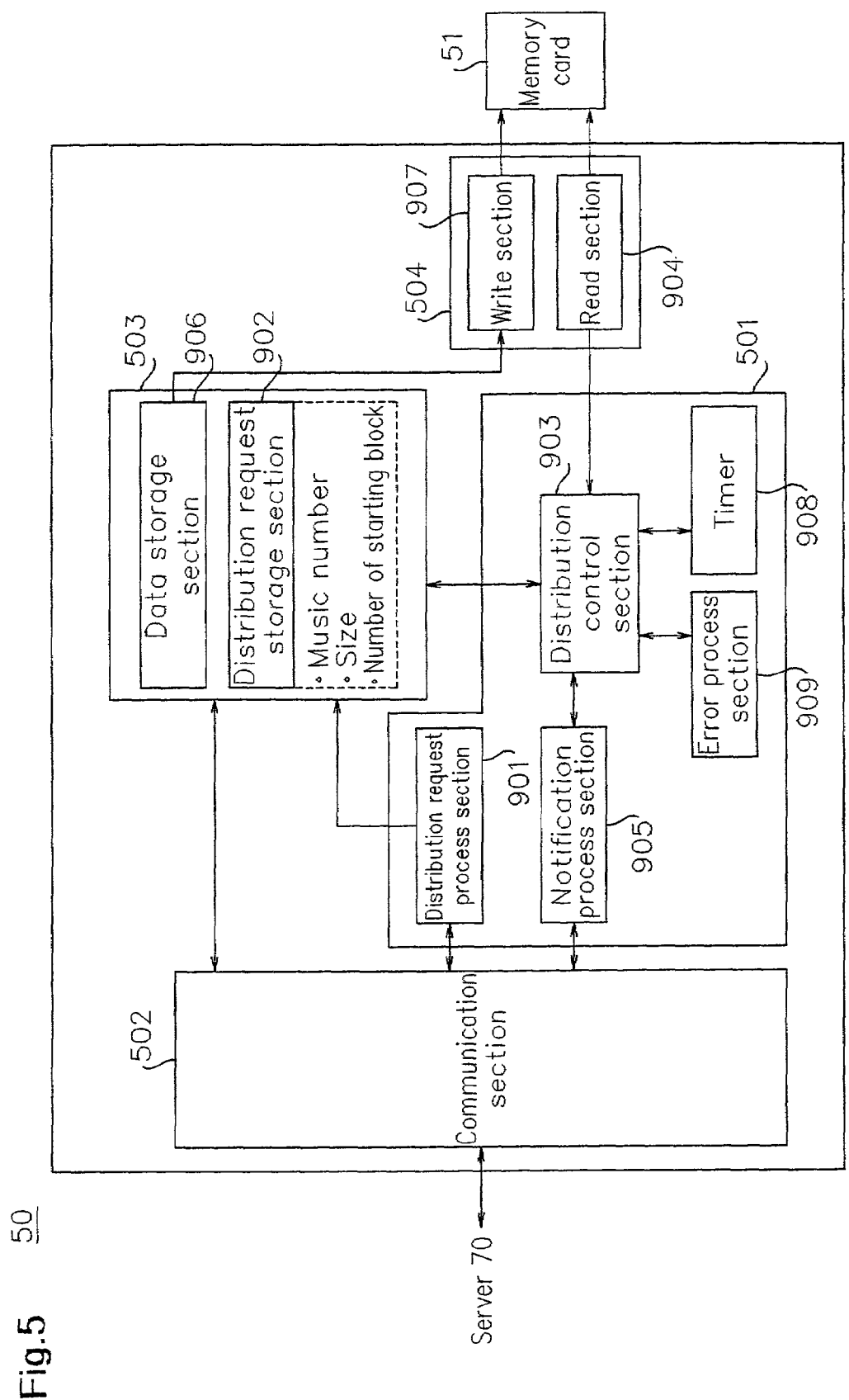
FIG. 5 illustrates a block diagram showing the function of a portion the information receiver of the embodiment in greater detail.

Next, functions that the control section 701 of the server 70 and the control section 50 of the information receiver 50 perform by executing the program stored in the memory section 702 and 503 are described using FIG. 4 and FIG. 5.

FIG. 4 is a block diagram showing the functions and features of the server 70 and FIG. 5 is a block diagram showing the functions and features of the information receiver 50. In the server shown in FIG. 4, the request process section 801 transmits a request menu screen or voice guidance to a user terminal via the communication section 703 based on the request from PC 20, the cellular telephone 30 and the telephone 40 when the server 70 functions as a WEB request server 64 or a voice request server 65. A request menu screen and voice guidance transmitted from the request process section 801 are stored at the memory section 702. The request process section 801 sets the distribution time input by a user terminal following the request menu screen or voice guidance to the timer 802.

The distribution request process section 803 performs the necessary processing on the distribution request (hereafter referred to as "distribution request A") received from the contents server 10 via the communication section 703 and stores the request in the distribution request storage section 804 of the memory section 702, when the server 70 serves as a distribution server 66. Here the necessary processing includes dividing the music data into plural blocks and allocating a block number to each block data. The information stored in the distribution request storage section 804 can include a music number, size, the number of the starting block, a music file name, a music file, addressee's telephone number, and sound type.

The distribution control section 805 sends necessary instructions for distributing the music data requested by a user to the information receiver 50, at the time that is set in the timer 802, to the call process section 806, the communication process section 807 and the distribution request process section 803.

More specifically, the distribution control section 805 instructs the call process section 806 to transmit a specified call signal to the information receiver 50 via the communication section 703 at the time set in the timer 802.

The distribution control section 805 instructs the distribution request process section 803 to transmit a necessary distribution request via the communication section 703 when the connection with the information receiver 50 that receives the specified call signal is established.

The distribution control section 805 instructs the notification process section 807 to transmit a necessary notification, to the information receiver from which the distribution request is received, via the communication section 703 when the distribution of music data begins.

Further, the distribution control section 805 decides if the music data needs to be distributed again when the distribution of the music data is interrupted. When redistribution is necessary, the distribution control section 805 distributes the interrupted music data again via the communication section 703.

The call process section 806 transmits a call signal to the information receiver 50 via the communication section 703 in accordance with instructions from the distribution control section 805. The distribution control section 805 provides such instructions based on the addressee's telephone number and the sound type stored in the distribution request storage section 804. The call process section 806 transmits a call signal of 1300 Hz to the information receiver 50 via the communication section 703 when the addressee's call type instructed by the distribution control section 805, is no sound(i.e. no ring). The call process section 806 transmits a call signal of 16 Hz via the communication section 703 when the instructed addressee's sound type is normal sound (i.e. a ring). In the call processing, it is possible to transmit 1300

Hz and 16 Hz only when the receiver is connected to an analogue telephone service network. When the receiver is connected to ISDN, the receiver is selected by the D channel control signal such as a sub-address identification signal identifying to device to receive the music data.

The distribution request process section 803 transmits a distribution request to the information receiver 50 via the communication section 703 according to the instructions of the distribution control section 805. (Hereafter, the distribution request mentioned here is referred to as "distribution request B") In this process, the distribution request process section 803 reads out music number, size and the starting block number from distribution request storage section 804, and transmits them to the information receiver 50. When the music data is redistributed after an interruption, the distribution request process section 803 transmits the music number and the starting block number of the interrupted music data to the information receiver 50 via the communication section 703 according to instructions from the communication control section 805.

The notification process section 807 transmits a necessary notification to the information receiver via the communication section 703 according to the instruction from the distribution control section 805. The necessary notification includes a block end notification that shows the end of transmission of each block when music data is transmitted as specified blocks, a data end notification that shows the end of music data transmission and a distribution end notification that shows the end of all distribution.

The notification process section 807 receives a specified response or confirmation transmitted by the information receiver 50 via the communication section 703 confirming receipt of the notification. The specified response includes an indication whether distribution is possible or impossible, that is transmitted by the information receiver 50 that received distribution request B transmitted by the distribution request process section 803 via the communication section 703. The specified confirmation also includes block confirmation transmitted by the information receiver 50 that received above mentioned end notification, data end confirmation transmitted by the information receiver 50 that received above mentioned data end notification, and distribution end confirmation transmitted by the information receiver 50 that received above mentioned distribution end notification.

The error process section 808 executes error processing of music distribution at predetermined timing in accordance with the instructions of the distribution control section 805. More specifically, it executes error processing of music data distribution when the information receiver 50 transmits a response of that distribution is impossible, or when it does not receives block confirmation, data end confirmation or distribution end confirmation within a predetermined time interval.

In the information receiver 50 shown in FIG. 5, the distribution request process section 901 stores the distribution request B received from the server 70 via the communication section 502 and transmits the same to the distribution request storage section 902 of the memory section 503.

The distribution control section 903 provides the necessary instructions to the notification process section 905, based on the data size of the music data stored in the distribution request storage section 902 and the available space of the memory card 51, which is read out by the reading section 904 of the memory card R/W section 504. For example, when the data size of music data is larger than the available space of the memory card 51, the distribution control section 903 instructs the communication process section 905 to transmit a response indicating that distribution is impossible to the server 70 via the communication section 703. On the other hand, when the size of the available space of the memory card 51 is larger than the size of music data, it instructs the notification process section 905 to transmit an indication that distribution is possible to the server 70 via the communication section 703.

The distribution control section 903 executes a necessary processing based on the music number and the start block number stored in the distribution request storage section 902. More specifically, when the start block number is not "1", the distribution control section 903 executes the necessary process. In other words, when new music data is distributed, the starting block number is usually "1". When the starting block number is not "1", the distribution control section 903 judges if the music data is being redistributed after an interruption in a previous distribution, for some reason.

The distribution control section 903 judges if the music data is the same as the music data that was interrupted during the previous distribution and is being redistributed. To judge that, the distribution control section 903 compares the music number and the block numbers of the previous distribution, and the music number and the starting block number of the present distribution. When the music data is judged to be music data that was interrupted during a previous distribution and is being redistributed, the distribution control section 903 instructs the notification process section 905 to transmit a response indicating that distribution is possible to the server 70 via the communication section 703. And at the same time, the distribution control section 903 stores the music data received during the previous distribution and the music data received during the present distribution in the data storage section 906 as a same music data. On the other hand, when the music data is judged not to be the one interrupted during the previous distribution and is now being redistributed, the distribution control section 903 instructs the communication process section 905 to transmit a response indicating that distribution is impossible to the server 70 via the communication section 703.

The notification process section 905 transmits a response indicating whether distribution is possible or impossible to the server 70 via the communication section 703 according to the instruction from the distribution control section 903. When it transmits a response indicating distribution is impossible, a response that distribution is impossible together with the reason why distribution is not possible, such as a shortage of memory capacity of the memory card 51, inconsistent music number of the music data or inconsistent starting block number, is transmitted to the server 70.

The notification process section 905 receives the block end notification, data end notification and distribution end notification from the server 70 via the communication section 502 when the data distribution ends between the communication process section and the server 70 according to instructions from the communication control section 903. On the other hand, the communication process section 905 transmits block confirmation, data end confirmation, and distribution end confirmation to the server 70 via the communication section 502 according to the instruction from the distribution control section 903.

The data storage section 906 of the memory section 503 stores music data received from the server 70 via the communication section 502. The write section 907 of the memory card R/W section 504 writes the music data to the memory card 51.

The distribution control section 903 calculates a predetermined reception time for the distribution of various kinds of information distributed from the server 70 to be measured by the timer 908 and instructs the error process section 909 to execute the error processing of a distribution error of the music data after the expiration of predetermined time. The error process section 909 executes the error processing of the music data at predetermined time according to the instruction from the distribution control section 903.

Next, the flow of music data distribution to a user in the music distribution service provided by the use of the information receiver and the server 70 of above-mentioned configuration is described. In the following description, it is described using the individual servers (i.e. the WEB request server 64, the voice request server 65 and the distribution server 66).

When a user wants to utilize the music distribution service, the user can proceed as follows. The users can actuate of access the browser, and access the WEB request server 64 to input the necessary information for the request. In the alternative, the users can use the telephone, and input a DTMF signal in accordance with voice guidance to input necessary information for the request. In these ways, the user inputs the information of desired music to the request server. On the other hand, the contents server 10 request distribution server to transmit the selected music information based on the request information input to the request server.

Figure 6:
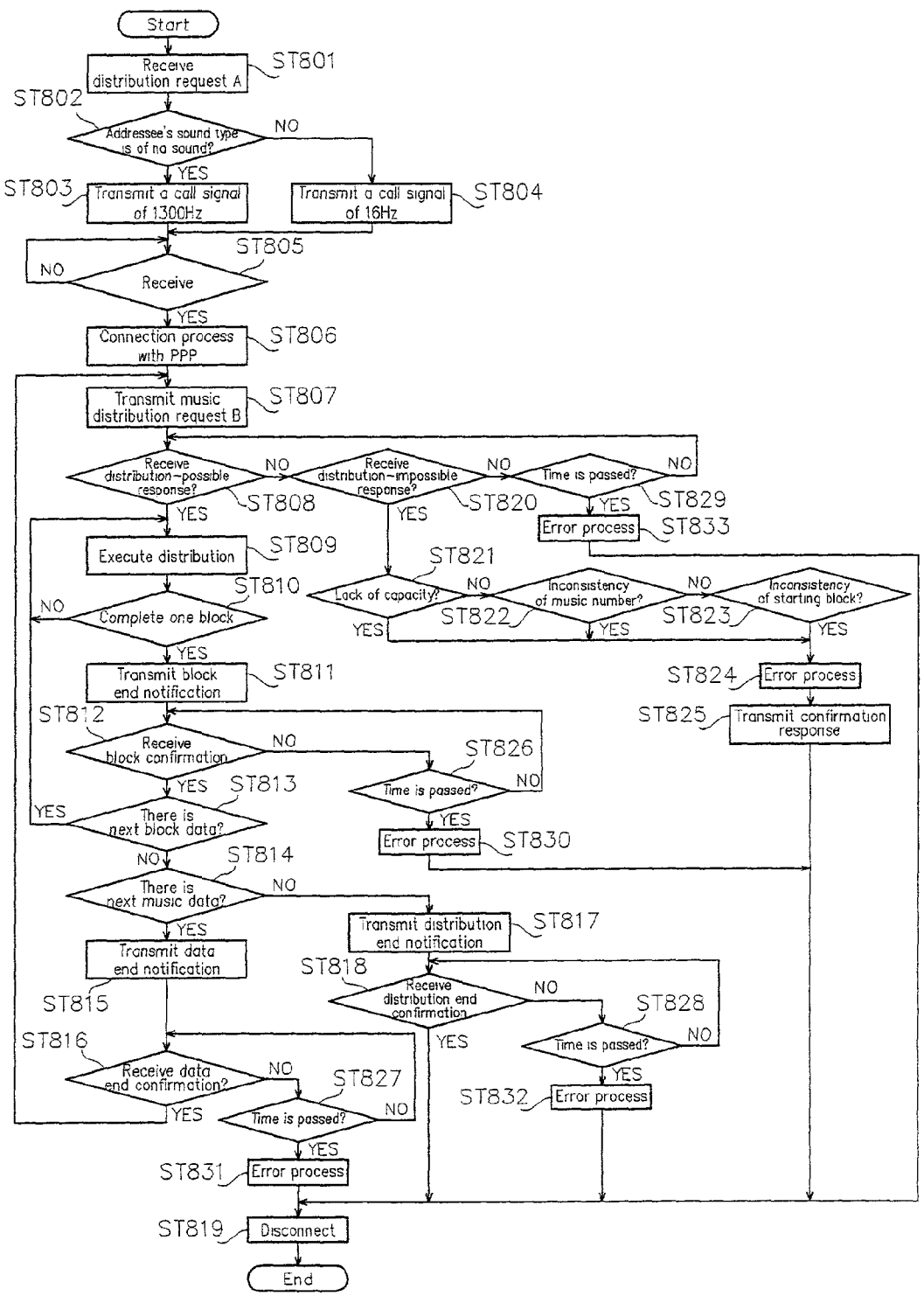
FIG. 6 illustrates a flow chart of the distribution server when music information is distributed to the information receiver of the embodiment.
Figure 7:
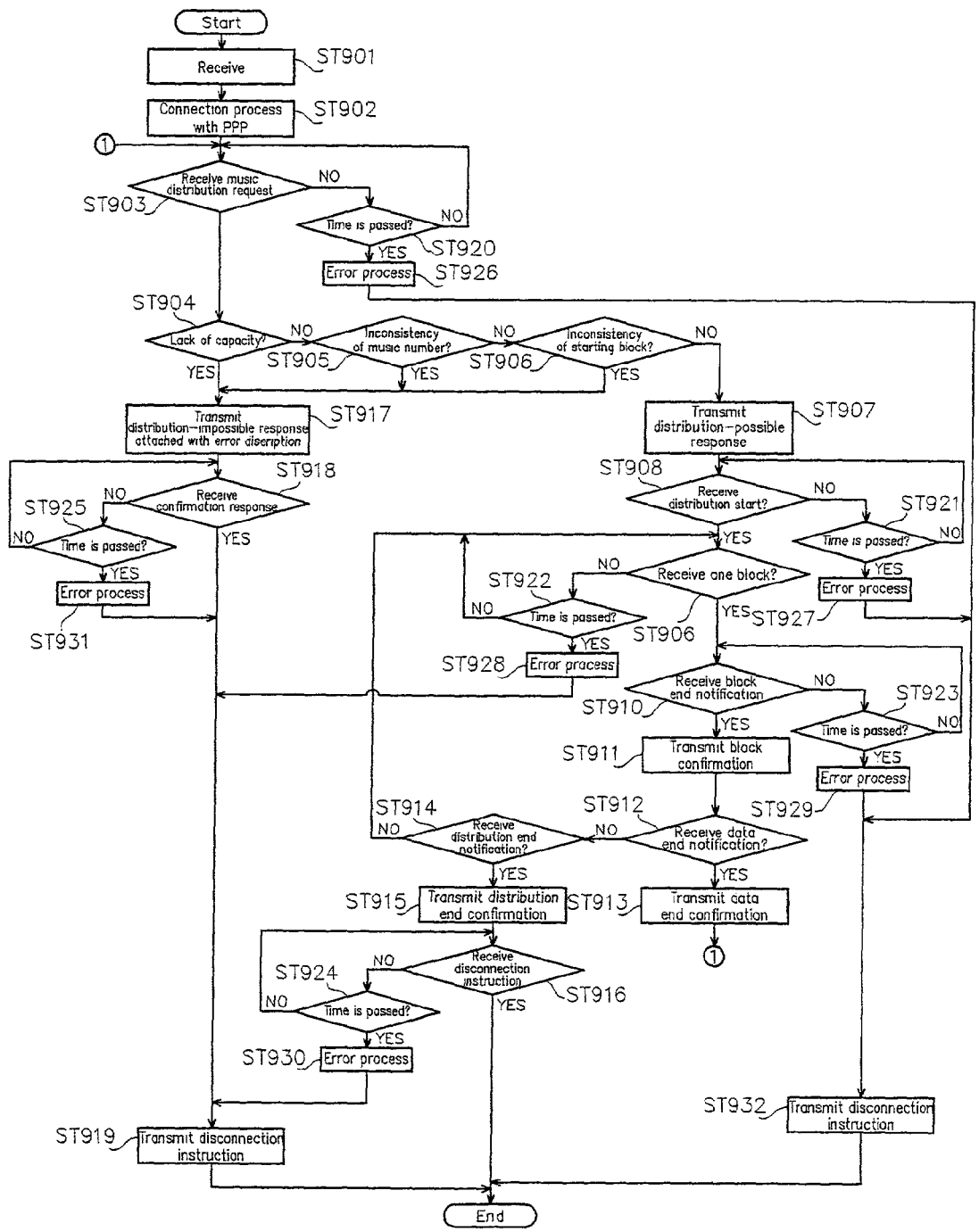
FIG. 7 illustrates a flow chart of the information receiver when music information is distributed from the distribution server of the embodiment.
Figure 9:
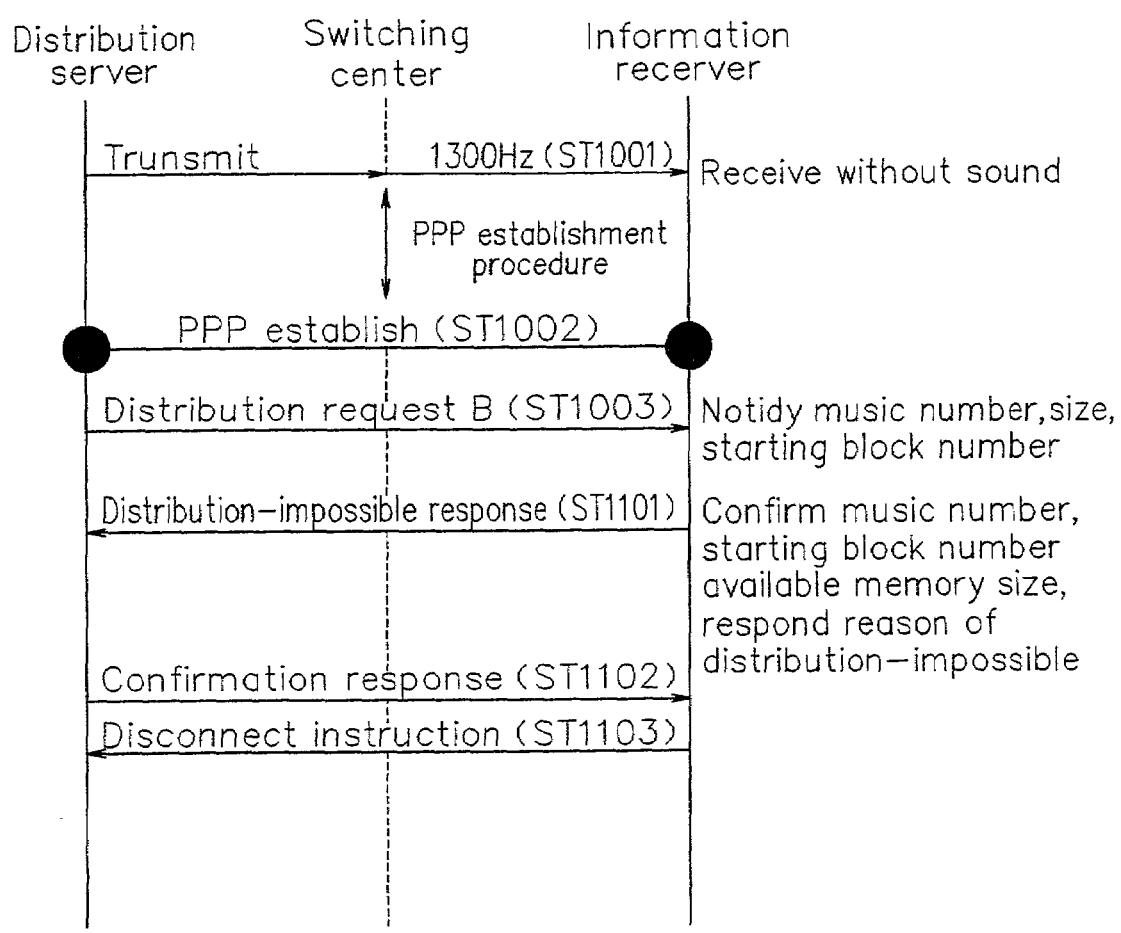
FIG. 9 illustrates a sequence chart for a situation in which the memory capacity of the information receiver is not large enough for receiving music data from the distribution server of the embodiment.

Next, music distribution flow is described using FIG. 6 and FIG. 7 referencing FIG. 4 and FIG. 5, in which, by a request operation from a user terminal such as PC 20 or a telephone 40 as mentioned above, the distribution server 66 that received distribution request A from the contents server 10 that received a request from the WEB server 64 or the voice request server 65, distributes music data to the information receiver 50. FIG. 6 is a flow chart of the operation of the distribution server 66 when the music data is distributed to the information receiver 50. FIG. 9 is a flow chart of the operation of the information receiver in the case that music data is distributed from the distribution server 66.

When the distribution server 66 distributes music data to the information receiver 50, the distribution server 66 receives a distribution request A from the contents server 10 in the previous step (ST801). The distribution request A is stored in the distribution request storage section 804 after the necessary processing by the distribution request process section 803. At this time, music number, size, the starting block number, music file name, music file, addressee's telephone number and a sound type are stored in the distribution request storage section 804 as described with respect to FIG. 4.

The distribution time requested by a user terminal such as PC 20 is set in the timer 802 of the distribution server 66. Here a flow chart showing operations at the instructed distribution time is illustrated. Prior to the distribution time set in the timer 802, the flow described below is executed after waiting for the arrival requested distribution time.

At the distribution time set at the timer 802, the distribution control section 805 checks if the instructed addressee has sound or has no sound based on the addressee's telephone number and the sound type stored in the distribution request storage section 804 (ST802). The distribution control section 805 instructs the call process section 806 to transmit a call signal corresponding to the sound type of the instructed addressee to the information receiver 50 via the communication section 703.

The call process section 806 transmits a call signal of 1300 Hz to the information receiver 50 via the communication section 703 when the instructed addressee's sound type is no sound (ST803). And the call process section 806 transmits a call signal of 16 Hz via communication 703 when the instructed addressee's sound type is sound (ST804).

When these call signals are transmitted and the information terminal 50 receives them (ST805), the connection process of the transmission path is executed between the distribution server 66 and the information receiver 50 using PPP (Point to Point Protocol). (ST806)

When the connection process is completed, the distribution control section 805 instructs the distribution request process section 803 to transmit a predetermined distribution request via the communication section 703. The distribution request process section 803 reads out only music number, size, and the starting block number, and transmits distribution request B to the information receiver 50 via communication section 703 (ST807).

When the distribution request B is transmitted, the information receiver 50 transmits response indicating distribution is possible or distribution is impossible based on the distribution request B. The notification process section 807 judges if the response regarding distribution possible or impossible is received or not (ST808). Here it is assumed that the notification process section 807 received the response indicating that distribution is possible from the information receiver 50.

Receiving the response indicating that distribution is possible, the notification process section 807 notifies the distribution control section 805 of this response. The distribution control section 805 executes the distribution of music data, upon receiving the notification. (ST809)

More specifically, the distribution control section 805 transmits one block of music data to the information receiver 50 based on the music file and the starting block number stored in the distribution request storage section 804. Here, music data is a music data of one piece of music and music file consists of music data of one piece or multiple pieces of music.

When transmission of one block of music data is completed (ST810), the distribution control section 805 instructs the notification process section 807 to transmit a block end notification via the communication section 703. Receiving the instruction, the notification process section 807 transmits a block end notification to the information receiver 50 (ST811).

After transmitting a block end notification, the notification process section 807 judges if block confirmation is received from the information receiver 50 or not (ST812). When block confirmation is received, the notification process section 807 notifies the distribution control section 805. It is assumed that block confirmation is received from the information receiver 50.

Receiving notification of reception of block confirmation from the communication process section 807, the distribution control section 805 checks if there is a next music data, based on the size of the music data (number of blocks) stored in the distribution storage section 804 (ST813). It is assumed that there is next data of music.

Since there is a next music data, the distribution control section 805 goes back to ST809 and repeats the processes from ST809 to ST813 until the end of block data of the music data.

After repeating the processes from ST809 to ST813 until there is no next block of music data in the process of ST813, the distribution control section 805 checks if there is next music data based on the music files stored in the distribution request storage section 804 (ST814). It is assumed that there is one more music data.

Since there is next music data, the distribution control section 805 instructs the communication process section 807 to transmit data end notification via the communication section 703. Receiving the instruction, the communication process section 807 transmits data end notification to the information receiver 50 via the communication section.

After transmitting the data end notification, the communication process section 807 checks the reception of data end confirmation from the information receiver 50 (ST816). When data end confirmation is received, the communication process section 807 notifies the distribution control section 805 of the data end confirmation. It is assumed that data end confirmation is received from the information receiver 50.

Upon receiving a notification of reception of data end confirmation from the communication process section 805, the distribution control section 805 goes back to ST807, and repeats processes from ST807 to ST816 until there is no next data.

Since it was previously assumed that there is only one more music data, the distribution control section 805 judges that there is no next music data. When there is no next music data, the distribution control section 805 instructs the communication process section 807 to transmit distribution end notification via the communication section 703. Receiving this notification, the communication process section 807 transmits distribution end notification to the information receiver 50 (ST817).

After transmitting the distribution end notification, the communication process section 807 checks the reception of distribution end confirmation from the information receiver 50 (ST818). When the distribution end confirmation is received, the communication process section 807 notifies the distribution control section 805 of the confirmation. It is assumed that distribution end confirmation is received from the information receiver 50.

Receiving a notification of reception of distribution confirmation from the communication process section 807, the distribution control section 805 disconnects the communication line (ST819). Thus the whole flow for the distribution server 66 to distribute music data to the information receiver 50 is completed.

When the communication process section 808 does not receive a response indicating that distribution is possible in ST808, the communication process section 807 checks for reception of an indication that distribution is impossible from the information receiver 50 (ST820). It is assumed that the communication process section 807 received response indicating that distribution is impossible from the information receiver 50.

Receiving the indication that distribution is impossible, the communication process section 807 notifies the distribution control section 805 of the medication. Receiving the notification, the distribution control section 805 checks the contents of the indication that distribution is impossible.

More specifically, the distribution control section 805 checks if the reason for the indication that of distribution is impossible is because of lack of capacity (ST821), or inconsistency of music number (ST822), or inconsistency of the starting block (ST823). The distribution control section 805 then instructs the error process section 808 to execute the error processing. The error process section 808 executes the error processing according to the instruction (ST824).

After that, the distribution control section 805 instructs the notification process section 807 to transmit a confirmation indicating reception of an indication that distribution is impossible via the communication section 703. According to this instruction, the notification process section 807 transmits a confirmation to the information receiver 50 via communication section 703 (ST825).

After transmitting the confirmation, the distribution control section 805 disconnects the communication line and ends distribution of music data.

When a predetermined time passes without receiving block confirmation from the information receiver 50 in ST812 (ST826), or when a predetermined time passes without receiving data end confirmation from the information receiver 50 in ST816 (ST827), or when a predetermined time passes without receiving distribution end confirmation from the information receiver 50 in ST818 (ST828), or when a predetermined time passes without receiving an indication that distribution is possible (or impossible) in ST808 (or ST820), the distribution control section 805 judges if redistribution is necessary. In other words, the distribution control section 805 judges the necessity of redistribution of the music data by checking if distribution of the music data has been interrupted or not. The distribution control section 805 judges whether an interruption of the music data has occurred based on the confirmations received from the information receiver 50 and executes redistribution of the music data a preset the number of times, resetting the starting block after the interruption.

After repeating the redistribution of music data preset of times, the distribution control section 805 instructs the error process section 808 to execute error process of music distribution. According to the instruction, the error process section 808 executes error process of music data (from ST830 to ST833). After that, the distribution control section 805 disconnects the communication path (ST819) and ends distribution of music data.

On the other hand, as shown FIG. 7 when the information receiver 50 receives distribution of music data from the distribution server 66 (the server 70), the information receiver 50 receives a call signal transmitted from the distribution server 66 (ST901). When the call signal is received, the connection process is executed in accordance with PPP between the information receiver 50 and the distribution server (ST902).

When communication path is established, the distribution request process section 901 checks the reception of distribution request B from the distribution server 66 (ST903). Here it is assumed that the distribution request B is received from the distribution server 66.

Receiving the distribution request B, the distribution request process section 901 notifies the distribution control section 903 and stores the distribution request B in the distribution request storage section 902. The distribution request B includes music number, size and the starting block number as mentioned above.

Receiving notification of reception of the distribution request B, the distribution control section 903 checks if distribution of the music data requested by the distribution request B is possible(ST 907), based on the information stored in the distribution request storage section 902 and the available space information of the memory card 51 read by the read out section 904.

More specifically, the distribution control section 903 checks the possibility of the memory card 51 having inadequate capacity for downloading the music data, comparing the size of the music data stored in the distribution request storage section 902 with the available space of the memory card 51 (ST904). When there is no possibility of inadequate capacity, it then checks if the music number stored in the distribution request storage section 902 and the requested music number are consistent (ST905). If the music numbers are consistent, it checks if the starting block number is consistent with the desired starting block number (ST906). Here it is assumed that there is no error in processes from ST904 to ST906.

Since there is no error in the processes from ST904 to ST906, the distribution control section 903 decides that it is possible to distribute the music data of the distribution request B. Then the distribution control section 903 instructs the notification process section 905 to transmit a response that distribution is possible to the communication process section 905 via the communication section 802. According the instruction, the notification process section 905 transmits a response that distribution is possible to the distribution server 66 via the communication section 502 (ST907).

After the transmission of the response that distribution is possible, the distribution control section 903 checks the start of distribution of music data from the distribution server 66 (ST908). Here it is assumed that the distribution server started the distribution of music data. The distributed music data is stored in the data storage section 906 via the communication server 502.

After the start of distribution of the music data from the distribution server 66, the distribution control section 903 checks if one block of music data is received within a preset time interval (ST909). Here it is assumed that one block of music data is received within a preset time interval.

After the reception of one block of music data, the notification process section 905 checks if block end notification is received from the communication server 66(ST910). When a block end notification is received, the notification process section 905 notifies the distribution control section 903. Here it is assumed that a block end notification is received from the distribution server 66.

Receiving a notification of reception of a block end notification from the notification process section 905, the distribution control section 903 instructs the notification process section 905 to transmit block confirmation via communication section 502. According to the instruction, the notification process section 905 transmits block confirmation to the communication server 66 via the communication section 502 (ST911).

After transmitting block confirmation, the notification process section 905 checks if data end notification is received from the distribution server 66 (ST912). When data end notification is received, the notification process section 905 notifies the distribution control section 903. Here it is assumed that there is one more music data, the same as the flow of the distribution server 66 mentioned above, and that data end notification is received from the distribution server 66.

Upon notification of the reception of data end notification from the notification process section 905, the distribution control section 903 instructs the notification process section 905 to transmits data end confirmation via the communication section 502. According to the instruction, the notification process section 905 transmits data end confirmation to the distribution server 66 via the communication section 502 (ST913).

After the transmission of data end notification to the distribution server 66, the distribution control section returns to the process ST903 and repeats the processes from ST903 to ST913 until there is no other music data to be distributed.

Since it is assumed that there is one more music data and data end notification is not received in ST912, the notification process section 905 checks the reception of distribution end notification from the distribution server 66 (ST914). When distribution end notification is received, the notification process section 905 notifies the distribution control section 903. Here it is assumed that distribution end notification is received.

Upon notification of the reception of distribution end notification from the notification process section 905, the distribution control section 903 instructs the notification process section 905 to transmit distribution end confirmation via the communication section 502. According to the instruction, the notification process section 905 transmits distribution end confirmation to the distribution server 66 via the communication section 502 (ST915).

After the transmission of distribution end confirmation, the distribution control section 903 checks for the reception of a disconnection instruction with respect to the line connected to the distribution section 66 (ST916). When the disconnection instruction is received, the line is disconnected. And distribution of music data from the distribution server 66 is completed.

If there is any error in ST904, ST905 or ST906, the distribution control section 903 instructs the notification process section 905 to transmit a response that distribution is impossible with the error description attached thereto via the communication section 502. According to the instruction, the notification process section 905 transmits a response indicating that distribution is impossible to the distribution server 66 via the communication section 502 (ST917).

The processes of ST905 and ST906 are for the distribution control section 903 to make a judgment when music data are redistributed from the distribution server 66. In other words, these are processes for the distribution control section 903 to check the consistency of the music number of the music data when distribution is interrupted in the previous distribution with the music number of the music data to be distributed (ST905), or to check the consistency of the starting block number of the music data with the block number of the block that was previously interrupted (ST906). Thus a response that distribution is impossible is transmitted based on the music number and the starting block number that are included in the distribution request from the distribution server 66. It is thus possible to prevent erroneous distribution of music data because the distribution server 66 controls the distribution of music data upon receiving the response that distribution is impossible.

Transmitting response that distribution is impossible, the notification process section 905 checks the reception of confirmation response from the distribution server 66 (ST918). When the confirmation response is received, the notification process section 905 notifies the distribution control section 903. Here it is assumed that confirmation response is received.

Upon notification of the reception of confirmation response from the notification process section 905, the distribution control section 903 instructs disconnection of the line via the communication section 502 (ST919) and distribution of music data from the distribution server 66 is completed.

When a preset time is passed without receiving distribution request B from the distribution server 66 in ST903 (ST920), or when a preset time is passed without starting distribution of music data from the distribution server in ST908 (ST921), or when a preset time is passed without receiving one block of music data from the distribution server 66 in ST909 (ST922), or when a preset time is passed without receiving block end notification in ST910 (ST923), or when a preset time is passed without reception of disconnection instruction of the line from the distribution server 66 in ST916 (ST924), or when a preset time is passed without receiving a response confirmation from the distribution server 66 in ST918 (ST925), the distribution control section 903 instructs the error process section 909 to execute an error process of music data distribution. According to the instruction, the error process section 909 executes error process of music data distribution (from ST926 to ST931). After that, the distribution control section 805 transmits a disconnection instruction regarding connected line in ST932 (ST919) and completes music data distribution.

Figure 8:
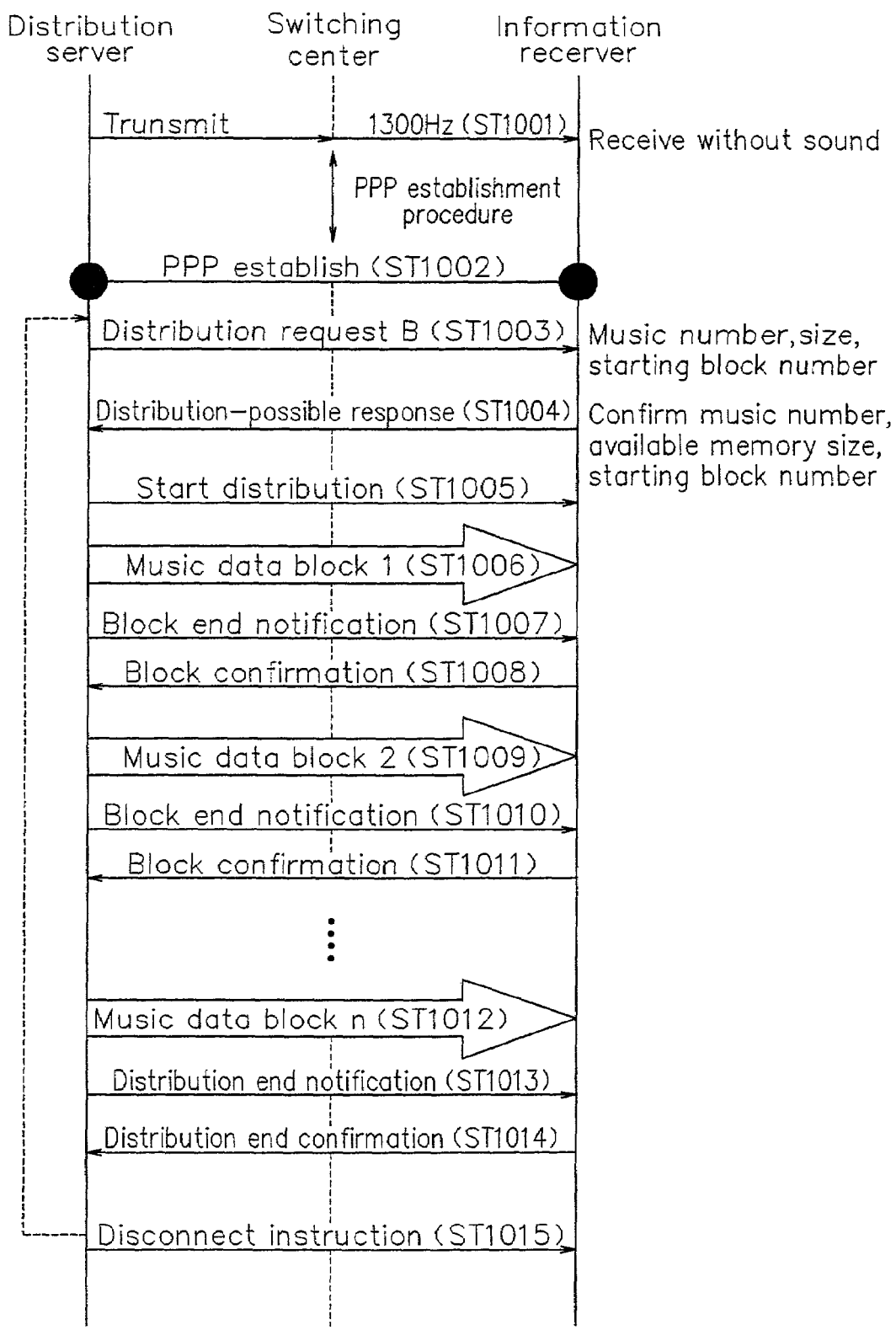
FIG. 8 illustrates a sequence chart for a situation in which music data is distributed normally from the distribution server of the embodiment.
Figure 10:
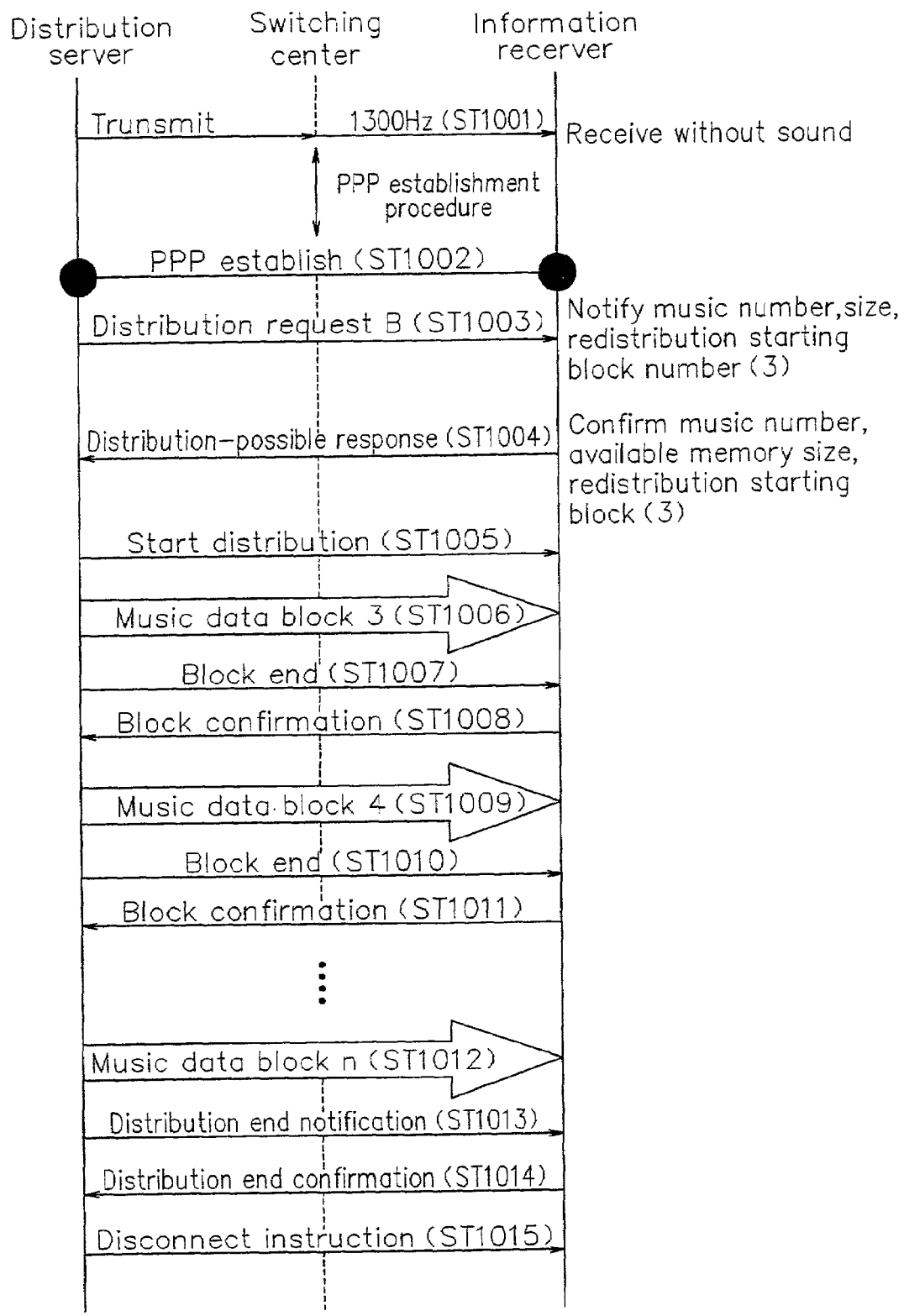
FIG. 10 illustrates a sequence chart of a situation in which a music data block is redistributed from the distribution server of the embodiment.

Next, the case that the distribution server 66 distributes music data normally, the case that distribution of music data is not normal because of inadequate memory capacity of the information receiver 50, and the case that music data blocks are redistributed from the middle of the music data are described using sequence charts shown FIG. 8 to FIG. 10. FIG. 8 shows a sequence when the distribution server 66 distributes music data normally. FIG. 9 shows a sequence when the memory capacity of the information receiver 50 is inadequate for receiving music data. FIG. 10 shows a sequence when music data blocks are redistributed from the middle of the music data. From FIG. 8 to FIG. 10, the sound type of the information receiver 50 is assumed to be of no sound. It is also assumed that the music data distributed the distribution server is one music and number of music data blocks is "n" in FIG. 8.

As shown in FIG. 8, a call signal of 1300 MHz is transmitted to the information receiver 50 via a switching center corresponding to the call from the distribution server 66 (ST1001). Receiving the call signal, the information receiver 50 receives it without sound.

When the information receiver 50 receives a call signal, a connection process is executed for the connection of the line between the distribution server 66 and the information receiver 50 based on the PPP establishment steps and the line connection is established (ST1002).

When the line connection is established, the distribution server 66 transmits a distribution request B to the information receiver 50 (ST1003). The distribution request B includes music number, size and the starting block number.

Receiving the distribution request B from the distribution server 66, the information receiver 50 confirms the music number, available memory size and the starting block number included in the distribution request B, and transmits response that distribution is possible to the distribution server 66 (ST1004).

Receiving the response that distribution is possible, the distribution server 66 starts distribution of music data (ST1005). First, the distribution server 66 transmits block 1 of music data to the information receiver 50 (ST1006). After the transmission of block 1, the distribution server 66 transmits block end notification (ST1007).

Receiving the block end notification from the distribution server 66, the information receiver 50 transmits block confirmation to the distribution server 66 (ST1008). Here, if block confirmation is not received within a preset time, the distribution server 66 terminates the communication.

Receiving the block confirmation from the information receiver 50, the distribution server 66 transmits block 2 of music data to the information receiver 50 in the same way as block 1 of music data (ST1009). After the transmission of block 2, the distribution server 66 transmits a block end notification (ST1010). Receiving the block end notification from the distribution server 66, the information receiver 50 transmits block confirmation to the distribution server 66 (ST1011).

Similarly, the distribution server 66 transmits music data up to the final block n to the information receiver 50 (ST1012). After the transmission of block n, the distribution server 66 transmits distribution end confirmation instead of block end notification because an entire piece of music data has been distributed.

After the transmission of a distribution end notification from the distribution server 66, the information receiver 50 transmits distribution end confirmation to the distribution server 66 (ST1014). Receiving the distribution end confirmation from the information receiver 50, the distribution server 66 transmits an instruction to disconnect the line connected to the information receiver 50, and at the same time, disconnects the line (ST1015). Thus the distribution server 66 distributes music data to the information receiver 50 normally.

When the distribution server 66 distributes more than one piece of music data, the distribution server 66 transmits data end notification instead of distribution end notification in ST1013. And the information receiver 50 transmits data end confirmation instead of distribution end confirmation in ST1014. Receiving the data end confirmation, the distribution server 66 returns to the process to ST1013 as shown in FIG. 8 by a dotted line, and again transmits the distribution request B to the information receiver 50. And then the distribution server 66 repeats the same process as for the first piece of music data.

Next, the process when music data is not distributed from the distribution server because of inadequate memory capacity of the information receiver 50, is described.

As shown in FIG. 9, when the storage capacity of the information receiver 50 is inadequate for distribution of music data, the process until the transmission of distribution request B from the distributions server 66 is the same as the process for the normal case (FIG. 8).

Upon receiving the distribution request B from the distribution server 66, the information receiver 50 confirms music number, available memory capacity and the starting block number, and transmits a response that distribution is impossible to the distribution server 66 (ST1101). In this process, the response that distribution is impossible is based upon inadequate memory capacity.

Upon receiving the response that distribution is impossible from the information receiver 50, the distribution server 66 transmits a confirmation response showing reception of the response that distribution is impossible to the information receiver 50 (ST1102).

Upon receiving the confirmation response from the distribution server 66, the information receiver 50 transmits an instruction for disconnecting the line connected to the distribution server 66 and disconnects the line (ST1103). Thus the process when the memory capacity of the information receiver 50 is inadequate for distribution of music data is terminated.

Next, when the distribution server 66 redistributes blocks of music data from the middle of music data is described. In FIG. 10, it is assumed that the distribution server 66 redistributes from block 3 of the music data. Redistributing from block 3 corresponds to the case that the previous distribution was only until block 2 due to a reason such as disconnection of the line.

In the case of music data redistribution, the process between the distribution server 66 and the information receiver 50 is the same as the process in normal distribution in most aspects. However it is different from the normal distribution that the starting block number included in the distribution request B transmitted from the distribution server 66 is block 3 and the size of music data is the size after block 3. The distribution server 66 starts transmission from the block 3 of music data and then transmits from block 4 to block n to the information receiver 50.

Thus the information receiver 50 can receive one entire piece of music in the form of music data by combining block 1 and block 2 that were previously received, with block 3 to block n of music data received during the redistribution.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. 2000-197097, filed on Jun. 29, 2000, which is herein expressly incorporated by reference in its entirety.

What is claimed is:

1. A server apparatus selectively connected to a first terminal apparatus and a second terminal apparatus, the first terminal apparatus having a capability of accessing a home page provided by the server apparatus, the second terminal apparatus being incapable of accessing the home page provided by the server apparatus and being capable of storing predetermined media data transmitted from the server apparatus, the server apparatus comprising:
  a receiver configured to receive a request from the first terminal apparatus having the capability of accessing the home page, the request being input at the first terminal via the home page provided by the server apparatus, the request including information regarding the predetermined media data and information regarding the second terminal that is incapable of accessing the home page; and
  a controller configured to:
    transmit a notification to the second terminal apparatus that is incapable of accessing the home page, the notification including a value representing a size of the predetermined media data, based on the request received from the first terminal apparatus;
    receive a response to the notification from the second terminal apparatus that is incapable of accessing the home page; and
    transmit the predetermined media data to the second terminal apparatus that is incapable of accessing the home page when the response indicates that the second terminal apparatus that is incapable of accessing the home page can store the predetermined media data, wherein said first terminal apparatus and said second terminal apparatus are distinct from each other.

2. The server apparatus according to claim 1, wherein the predetermined media data is divided into a plurality of predetermined data blocks, the controller transmitting each of the plurality of the predetermined data blocks to the second terminal apparatus that is incapable of accessing the home page.

3. The server apparatus according to claim 2, wherein the controller transmits a confirm notification to the second terminal apparatus that is incapable of accessing the home page after transmission of each of the plurality of the predetermined data blocks, the notification confirming that the second terminal apparatus that is incapable of accessing the home page received the transmitted data block.

4. The server apparatus according to claim 3, wherein the controller executes an error process when the controller does not receive a response to the transmitted notification.

5. The server apparatus according to claim 4, wherein the controller stores a block number indicating a transmitted data block when the controller does not receive the response to the transmitted notification, the controller executing the error process by re-transmitting the block, corresponding to the stored block number, to the second terminal apparatus that is incapable of accessing the home page.

6. The server apparatus according to claim 1, wherein the request from the first terminal apparatus having the capability of accessing the home page further includes a time value, the controller transmitting the predetermined media data to the second terminal apparatus that is incapable of accessing the home page at a predetermined time related to the time value.

7. The server apparatus according to claim 1, wherein the predetermined media data comprises music data.

8. The server apparatus of claim 1, wherein each of the first and second terminal apparatuses are configured to receive and transmit data independently of each other.

9. The server apparatus of claim 1, the predetermined media data comprising at least one of audio data and video data.

10. A server apparatus selectively connected to at least one of a first terminal apparatus and a second terminal apparatus, said first terminal apparatus having a capability of accessing a home page provided by the server, the second terminal apparatus being incapable of accessing the home page and being capable of storing predetermined media data transmitted from the server apparatus the, the server apparatus comprising:
  a receiver that receives a request via the home page, from the first terminal apparatus, for the predetermined media data to be transferred to the second terminal apparatus; and
  a controller that determines whether the second terminal apparatus has sufficient storage space to store the requested predetermined media data, said controller controlling the transfer of the requested predetermined media data to the second terminal apparatus when said controller determines that the second terminal apparatus has sufficient space to store the requested predetermined media data, wherein said first terminal apparatus and said second terminal apparatus are distinct from each other.

11. The server apparatus according to claim 10, wherein the predetermined media data comprises music data.

12. The server apparatus of claim 10, wherein each of the first and second terminal apparatuses are configured to receive and transmit data independently of each other.

13. The server apparatus of claim 10, the predetermined media data comprising at least one of audio data and video data.

14. A media data distribution method using a server apparatus, the server apparatus being selectively connected to a first terminal apparatus and to a second terminal apparatus, the first terminal apparatus having a capability of accessing a home page provided by the server apparatus, the second terminal apparatus being incapable of accessing the home page provided by the server apparatus and being capable of storing predetermined media data transmitted from the server apparatus, the media data distribution method comprising:

receiving a request from the first terminal apparatus that has the capability of accessing the home page, the request being input at the first terminal via the home page provided by the server apparatus, the request including information regarding the predetermined media data and information regarding the second terminal that is incapable of accessing the home page;

transmitting a notification to the second terminal apparatus that is incapable of accessing the home page, the notification including a value representing a size of the predetermined media data, based on the received request;

receiving a response to the notification from the second terminal apparatus that is incapable of accessing the home page; and transmitting the predetermined media data to the second terminal apparatus that is incapable of accessing the home page when the response indicates that the second terminal apparatus can store the predetermined media data, wherein the first terminal apparatus and the second terminal apparatus are distinct from each other.

15. The media data distribution method according to claim 14, wherein the predetermined media data comprises music data.

16. The media data distribution method according to claim 14, each of the first and second terminal apparatuses being configured to receive and transmit data independently of each other.

17. The media data distribution method according to claim 14, the predetermined media data comprising at least one of audio data and video data.

* * * * *